United States Patent
Wilensky et al.

(10) Patent No.: US 9,176,662 B2
(45) Date of Patent: Nov. 3, 2015

(54) SYSTEMS AND METHODS FOR SIMULATING THE EFFECTS OF LIQUIDS ON A CAMERA LENS

(75) Inventors: Gregg D. Wilensky, Pacific Palisades, CA (US); Aravind Krishnaswamy, San Jose, CA (US); Jose Ignacio Echevarria Vallespi, Zaragoza (ES)

(73) Assignee: Adobe Systems Incorporated, San Jose, CA (US)

( * ) Notice: Subject to any disclaimer, the term of this patent is extended or adjusted under 35 U.S.C. 154(b) by 632 days.

(21) Appl. No.: 13/448,147

(22) Filed: Apr. 16, 2012

(65) Prior Publication Data

US 2013/0120386 A1 May 16, 2013

Related U.S. Application Data

(60) Provisional application No. 61/528,007, filed on Aug. 26, 2011.

(51) Int. Cl.
| | |
|---|---|
| G06F 3/041 | (2006.01) |
| G06T 15/50 | (2011.01) |
| G09G 5/00 | (2006.01) |
| G06F 3/0488 | (2013.01) |
| G06F 3/0484 | (2013.01) |
| G06T 13/60 | (2011.01) |
| G06T 15/06 | (2011.01) |
| G06T 15/80 | (2011.01) |

(52) U.S. Cl.
CPC .......... *G06F 3/0488* (2013.01); *G06F 3/04847* (2013.01); *G06T 13/60* (2013.01); *G06T 15/06* (2013.01); *G06T 15/80* (2013.01)

(58) Field of Classification Search
USPC ........................................ 345/173, 426, 647
See application file for complete search history.

(56) References Cited

U.S. PATENT DOCUMENTS

2003/0090484 A1* 5/2003 Comair et al. ................ 345/420

OTHER PUBLICATIONS

Robert A. Cross, Interactive Realism for Visualization Using Ray Tracing, Proceedings of the 6th conference on Visualization '95, p. 19, Oct. 29-Nov. 3, 1995.*
R. L Cook, T. Porter, and L. Carpenter, "Distributed Ray Tracing", Computer Graphics, vol. 18, No. 3, pp. 137-145, 1984.
Real-Time Refraction Through Deformable Objects. Manuel M. Oliveira and Maicon Brauwers. ACM SIGGRAPH 2007 Symposium on Interactive 3D Graphics and Games Seattle, WA, Apr. 30-May 2, 2007, pp. 89-96.
Fabio Policarpo, Manuel M. Oliveira, Joao Comba. Real-Time Relief Mapping on Arbitrary Polygonal Surfaces. ACM Transactions on Graphics. Volume 24, No. 3, pp. 935, Jul. 2005.
Chris Wyman. "An Approximate Image-Space Approach for Interactive Refraction." ACM Transactions on Graphics 24 (3), pp. 1050-1053. (Aug. 2005).

* cited by examiner

*Primary Examiner* — Stephen R Koziol
*Assistant Examiner* — Sohum Kaji
(74) *Attorney, Agent, or Firm* — Wolfe-SBMC

(57) ABSTRACT

Systems and methods for simulating liquid-on-lens effects may provide an interface through which users can add and/or manipulate fluids on a virtual camera lens. A physically based fluid simulation may simulate the behavior of the fluid as it is deposited on and/or manipulated on the virtual lens, and determine the distribution of the fluid across the lens. A ray tracing technique may be employed to determine how light is refracted through the virtual lens and the fluid, and to render a distorted output image as seen through the lens and the fluid. As the fluid is manipulated, corresponding changes in the image may be displayed in real time. The input image may be an existing single image or a direct camera feed (e.g., of a tablet type device). The user may select a fluid type and/or various fluid properties for the image editing operation.

20 Claims, 10 Drawing Sheets

SYSTEMS AND METHODS FOR SIMULATING THE EFFECTS OF LIQUIDS ON A CAMERA LENS

PRIORITY INFORMATION

This application claims benefit of priority of U.S. Provisional Application Ser. No. 61/528,007 entitled "Systems and Methods for Simulating the Effect of Liquids on a Camera Lens" filed Aug. 26, 2011, the content of which is incorporated by reference herein in its entirety.

BACKGROUND

Description of the Related Art

Analog photography is the result of several chemical processes and random artifacts that make it interesting for artists, given the unique creative effects they can achieve. However, going through all the steps involved in analog photography can be very time consuming and is not appealing to everyone. In addition, the materials required for analog photography can be expensive when compared with those required for digital photography.

On the other hand, digital cameras and image editing software make photography affordable for almost everyone. Unfortunately, while the migration from analog photography to digital photography brought new techniques and effects, some of the analog mood and "magic" were lost, resulting in a less engaging framework. Interestingly, some of the digital manipulations included in image editing software aim to re-capture the look and feel of analog photography.

SUMMARY

Systems and methods for simulating liquid-on-lens effects may allow artists to create effects in digital images that are similar to those created by depositing and manipulating a real-world fluid on a physical camera lens. For example, in some embodiments, an image editing application may provide an interface through which users can select an input image (or a source of input images) to which liquid-on-lens effects are to be applied, and can add and/or manipulate fluids on a virtual camera lens to create those effects. As the fluid is manipulated on the virtual lens, corresponding changes in the image may be displayed. In other words, the image editing application may create a modified image that reflects the distortion of the input image as though it were seen through the virtual camera lens and that reflects the addition and/or manipulation of the fluid on the virtual camera lens. In some embodiments, data representing the modified image may be stored for subsequent display and/or further modification.

In various embodiments, the image editing application may access data representing an existing single input image. For example, the application may obtain the data representing the image from a memory in which it is stored. In other embodiments, the image editing application may receive data representing one or more input images from a direct camera feed (e.g., image data captured by the camera of a tablet type device on which the image editing application is executing, or image data captured by a camera whose output is coupled to an input of a computer on which the image editing application is executing).

The image editing application may include a user interface module through which the user can select a fluid type and/or values for various parameters that represent physical properties of the fluid to be used in the image editing operation. For example, in some embodiments, the user interface module may provide mechanisms through which data can be received to indicate the selection of the fluid from among two or more fluids for which the values of one or more parameters that represent physical properties of fluids have been pre-defined. In other embodiments, the user interface module may provide mechanisms through which a user may select or specify a value for each of one or more fluid parameters. For example, the image editing application may support the specification and/or use of parameters whose values indicate the amount of fluid to be deposited on the virtual lens, the viscosity of the fluid, the color of the fluid, the pigment concentration of the fluid, the transparency of the fluid, and/or the index of refraction of the fluid. In some embodiments, the image editing application may model the behavior of the fluid (e.g., its distribution over the virtual camera lens as it is deposited on the lens and subsequently manipulated) using a physically based simulation that is dependent on the values of any or all of these parameters. The fluid may be modeled using a two-dimensional fluid grid and a height map, such that the height at each given point in the two-dimensional grid reflects the amount of fluid at that point.

In some embodiments, the image editing application may receive data representing the addition or manipulation of a selected fluid (e.g., a fluid having a pre-defined set of fluid properties) or a user-defined fluid (e.g., a fluid having one or more default or user-specified properties) on a virtual camera lens. For example, the image editing application may include a user interface through which input from a touch-based input device is received, and this input may specify that a particular fluid should be deposited on the virtual lens. In some embodiments, the input may also specify the amount of the fluid to be deposited and/or the location on the virtual lens at which the fluid should be deposited. In some embodiments, the input may represent an interactive manipulation of the fluid on the virtual lens (e.g., using a touch-based device or another type of cursor control mechanism).

In some embodiments, in response to receiving input representing the manipulation of the fluid on the virtual lens, the image editing application may model the behavior of the fluid as the fluid is manipulated on the virtual lens, and may simulate the changes in the distribution of the fluid across the lens due to the manipulation. Again, this modeling and simulation may be dependent on the values of various parameters that represent physical properties of the fluid.

In some embodiments, a ray tracing technique may be employed to determine how light is refracted through the virtual lens and the fluid, and to render a distorted output image that appears as if seen through the lens and the fluid. For example, the image editing application may perform a ray tracing operation that simulates light traveling from the input image to a virtual camera sensor, as refracted by the virtual camera lens and the fluid on the virtual camera lens and may render the modified image, dependent on this ray tracing operation. In some embodiments, as the fluid is manipulated on the virtual lens, corresponding changes in the image may be displayed in real time (e.g., on a display device of, or coupled to, the computer on which the image editing application is executing).

Figure 1:
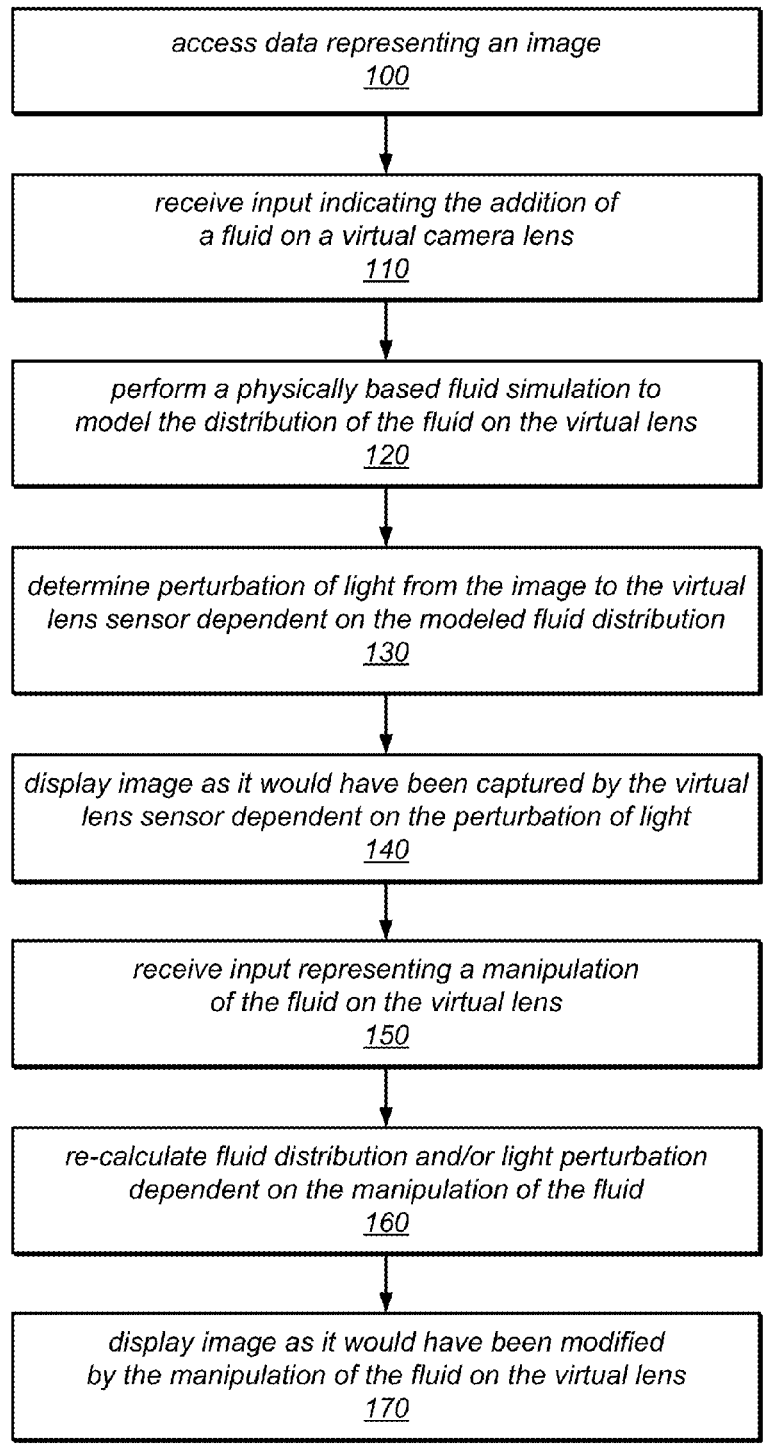
FIG. 1 is a flow diagram illustrating one embodiment of a method for simulating the effects of fluids on a camera lens.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The systems and methods described herein may implement an interactive, physically based image editing application. The image editing application (or various modules thereof) may be configured to simulate the creative image distortions that some experimental analog photographers achieve in their works of art by manipulating the lenses of their cameras. In particular, the image editing application may simulate the results of pouring and smudging viscous liquids on the lens. First, the application may perform a physically based simulation of the effects and behavior of fluids on camera optics (e.g., on a camera lens and corresponding sensor) that reacts realistically to user input (e.g., input that specifies the addition and/or manipulation of various fluids on a virtual camera lens) and determines the distribution of the fluid(s) resulting from their addition and/or manipulation. In some embodiments, this fluid simulation may take into account various properties of the applied fluid (e.g., viscosity) in determining how the fluid is distributed across the virtual camera lens. Note that, in different embodiments, any of a variety of physically based fluid solvers may be employed in the simulations described herein.

In some embodiments, the application may then use the determined fluid distribution to determine how the light traveling from the input image to the virtual camera lens sensor is perturbed, e.g., by tracing rays through the virtual lens and the fluid itself. In some embodiments, this ray tracing process may take into account additional properties of the applied fluid (e.g., the transparency, the index of refraction, the color tint, a scaling factor for the distortion, or other properties). In some embodiments, the fluid simulations, ray tracing, and/or various calculations thereof are performed in real time, providing the user with instant feedback for better control of the results. As used herein, references to "ray tracing" may refer to any of a variety of image generation techniques in which light is traced as it passes through pixels in an image plane and the effects of its encounters with other objects (e.g., a virtual lens and/or fluid on such a lens) are simulated. The image editing applications described herein may be configured to run on various tablet devices, in some embodiments, and may receive input through their off-the-shelf touch-based interface(s) and/or other built-in input devices, such as gyroscopes or accelerometers.

The source image input to the system, i.e. the image that will be used for obtaining a new distorted version, may be an existing image (e.g., one loaded by the system as input to a particular fluid simulation and corresponding rendering operation), or it may be provided directly by a camera feed of the device on which the application is running (if such a camera feed is available), in different embodiments. In some embodiments, the user may optionally choose a virtual lens to use, or the system may be configured to simulate (automatically) the original lens of a built-in camera (if a direct camera feed is being used), or the camera used to obtain an existing image that is being modified, if that information is available. For example, the image data may be formatted as an Exchangeable Image File (EXIF) or may otherwise include information about the lens of the camera through which it was captured, and the image editing application may extract that information from the image data and use it to automatically simulate the camera lens. Immediately after the image is loaded (or the camera feed is enabled), the user may see the original image refracted through the virtual lens. Subsequently, the user may manipulate the virtual lens by adding liquid to its surface, or by smearing, smudging, and/or mixing an existing amount of one or more liquids on the surface. These and other user actions may be performed via touch-based input, in some embodiments. Note that in some embodiments, the system may be configured to receive input indicating the addition and/or manipulation of fluids through traditional cursor control devices (e.g., a mouse, joystick, or track ball). However, the touch-based input mechanisms employed in other embodiments may provide a more natural interface for this creative process. In some embodiments, the fluid simulation may be stopped, reset, saved to, or loaded from memory at any time.

As noted above, the refraction of the original image through the virtual lens and fluid may be calculated in real time, so that the user can see the results of fluid additions and/or manipulations instantly. In some embodiments, the user may be able to specify and/or modify various properties of the fluid itself, such as the fluid type, the viscosity, the transparency, the index of refraction, the color tint, a scaling factor for the distortion, or other properties. In some embodiments, default values of some or all of such properties may be defined for a collection of fluid types. In some embodiments, any or all default (or pre-set) property values may be overridden by the user for a particular image editing operation or session. In some embodiments, once the user achieves the desired result (e.g., through a series of manipulations of one or more fluids), the resulting distorted image may be saved as a new image, leaving the original intact. In other embodiments, only the modified image may be saved, and the original image may be discarded. In some embodiments in which the images being modified are provided by a direct camera feed, only the modified image(s) may be saved, while in other embodiments, both the raw camera input and the modified image(s) may be saved.

The techniques described herein may in some embodiments be used to re-introduce the organic nature of analog photography to the digital photography platform. They may employ novel physically based image editing tools with intuitive interfaces to provide an engaging user experience through which an organic quality (e.g., various soft textural features associated with liquid-on-lens type effects) can be applied to digital images. In other words, the systems and methods described herein may be used to add effects to a digital image that are similar in richness to those possible using real, natural media (e.g., film, paper, and chemicals).

In various embodiments, the methods for image editing described herein may be explicitly invoked by a user in order to edit an image. In other embodiments, they may be invoked automatically (e.g., by the image editing application) in response to the application receiving or accessing an input image. The input images edited by the application may include a single existing image (e.g., one loaded by the user for a particular image editing operation or session) or an image obtained in real time from a direct camera feed (if available). The methods may include modeling a virtual camera lens that can be manipulated as if it were a real (physical) camera lens. The manipulations supported in the system may include pouring and smearing liquids on the lens (e.g., using touch input or any other suitable input mechanisms). The methods may then include calculating the light transported through the manipulated virtual lens in order to obtain the final image, or to obtain an intermediate negative image that may need to be developed in a separate process. For example, in embodiments in which a negative image is produced, the negative image may be transferred to a supporting medium, and the supporting medium may be further manipulated as in a real photo (e.g., adding varnish, scratches, textured surfaces, etc.)

In various embodiments, the user may touch a representation of the virtual lens (e.g., in a display portion of a tablet device) in order to pour liquid or smear (e.g., move and/or spread around) an existing liquid on the virtual lens. In some embodiments, the fluid simulation may reflect a realistic behavior of the particular fluid. In some embodiments, the distribution of the fluid may be affected by built-in accelerometers of the tablet device (if available and enabled) in addition to, or instead of, touch input or input using other cursor control type mechanisms. In such embodiments, the simulation may model the effects of gravity on the tablet device and, by extension, on the fluid on the virtual lens (e.g., "sloshing" the fluid around on the virtual lens as the tablet device is tilted or otherwise manipulated in 3D space). As noted above, the user may be able to modify the properties of the fluid (e.g., the fluid type, viscosity, the transparency, the index of refraction, the color tint, a scaling factor for the distortion, or other properties) through a user interface of the image editing application. In some embodiments, the simulations, ray tracing operations, and/or other calculations described herein may run interactively to provide the best and/or quickest feedback to the user. In some embodiments, a fluid simulation in progress may be paused, reset, or saved for future use. The image application may provide interactive virtualization of the results of an image distortion exercise, as refracted through the lens and fluid (according to the simulated fluid distribution). In some embodiments, the user may be able to zoom and/or pan an image (e.g., an original image or a working version of an image being modified) for a closer look (e.g., for better inspection). The application may use an image-space approach for ray tracking, and may perform all the calculations in real time. In this way, the application may be able to simulate the effects of various fluid-on-lens manipulations (on an existing image or camera feed) on the fly (i.e. as the manipulations are performed by the user).

In general, the systems and methods described herein may perform ray tracing from each pixel on a virtual sensor (which will contain the final image) through a virtual lens that has been modified by the addition and/or manipulation of fluid, based on the reflective properties of the virtual lens due to the presence of the fluid, and may determine the point in the input scene or input original image at which each ray hits (and the appearance of each pixel in the final image) based on various properties of the applied fluid. In some embodiments, all or a portion of the simulations, ray tracing, and other relevant calculations described herein may be performed in real time. In other embodiments, an initial real-time simulation may be performed (e.g., using a fast, GPU-based refraction technique), and when the user finishes experimenting with liquid-on-lens effects and wishes to commit the changes, a higher resolution process (e.g., a full-blown distributed ray tracing operation) may be applied offline (i.e. non-interactively) to produce the final distorted image. In still other embodiments, in response to selection of a fluid (and/or properties thereof) and/or input indicating locations at which the fluid should be applied to a virtual camera lens, the simulations, ray tracing, and other relevant calculations described herein may be performed offline to produce a distorted image.

Figure 2:
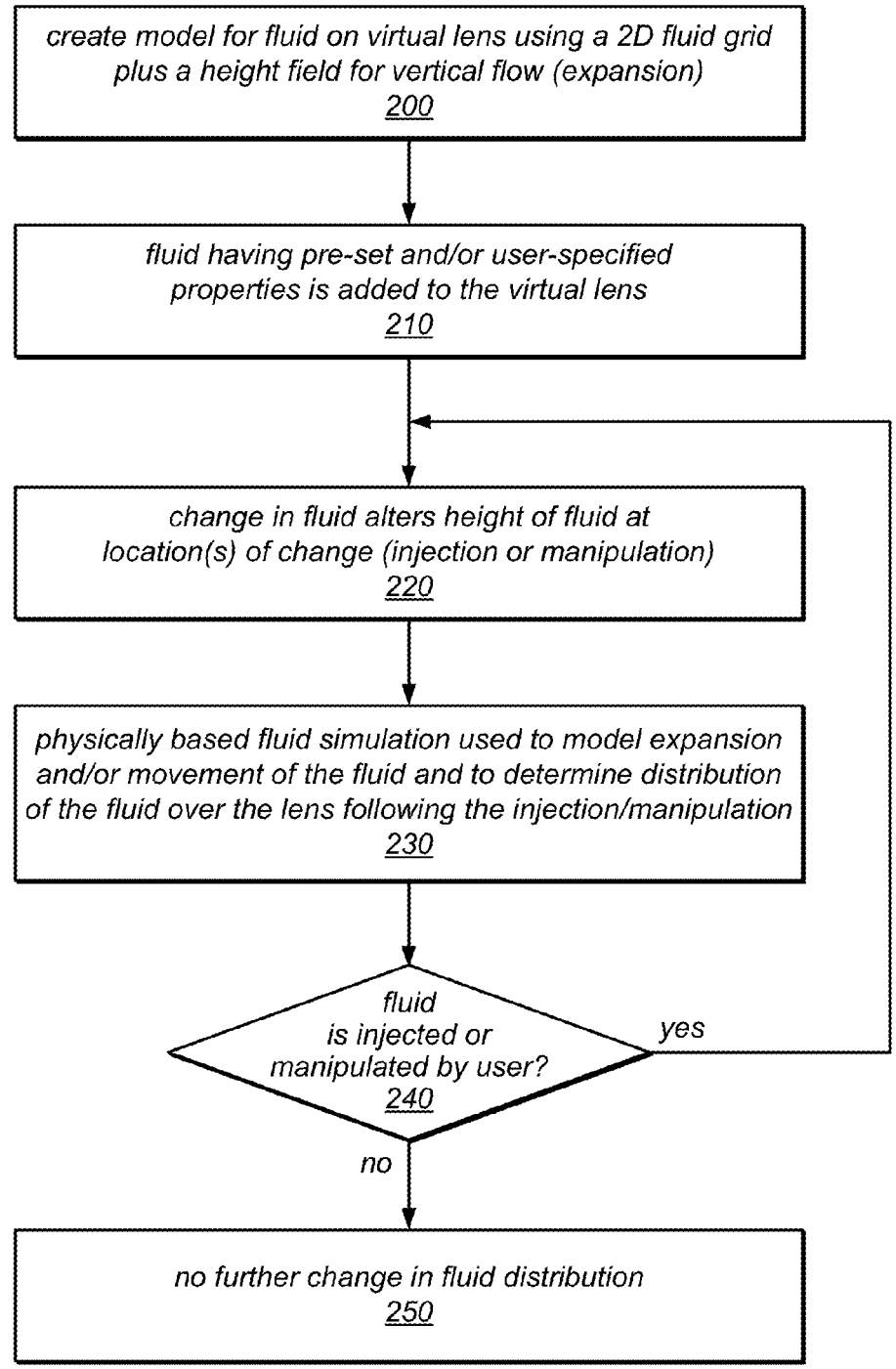
FIG. 2 is a flow diagram illustrating one embodiment of a method for simulating the distribution of a fluid on a virtual camera lens.
Figure 7:
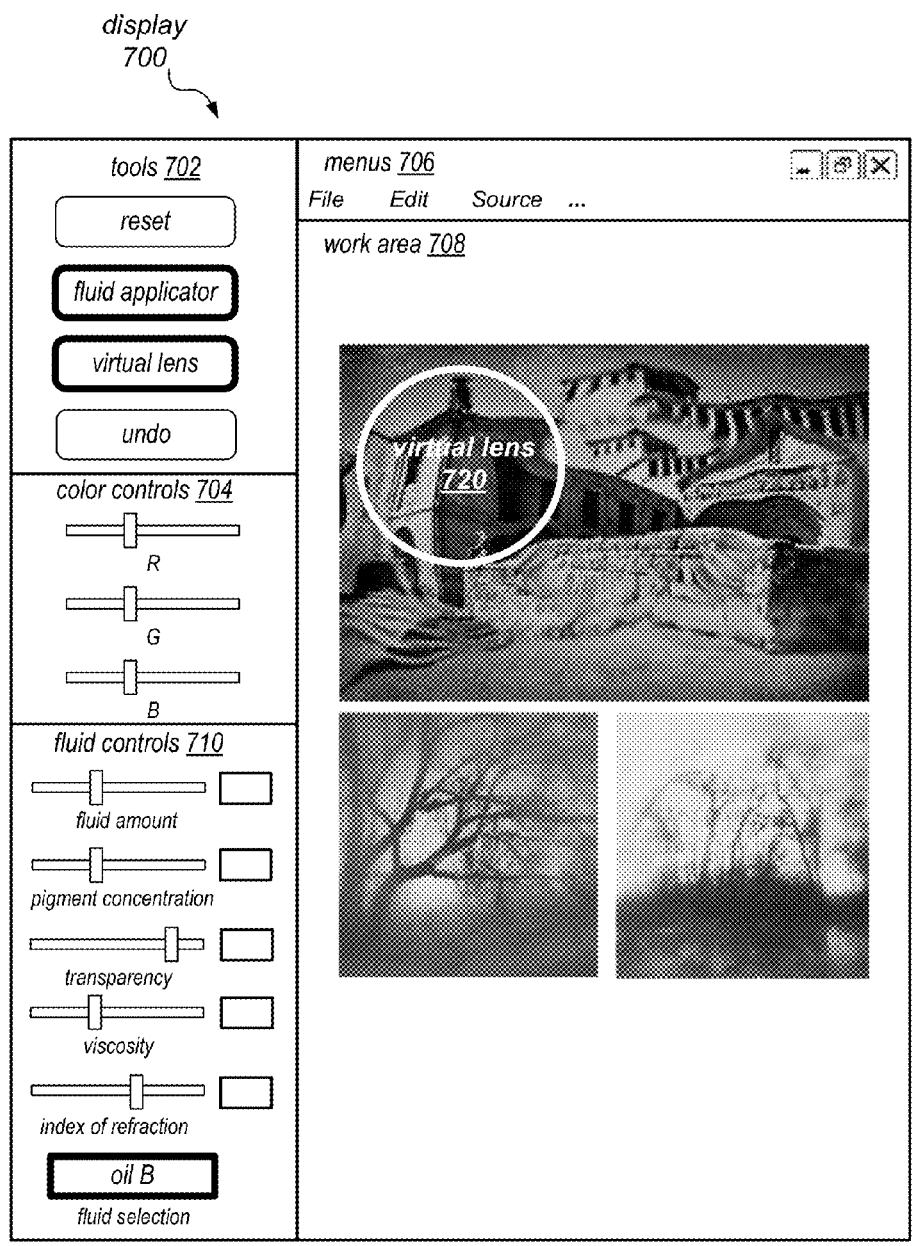
FIG. 7 is a block diagram illustrating one embodiment of a display for an image editing program that performs the simulation of fluids on a camera lens, as described herein.

One embodiment of a method for simulating the effects of fluids on a camera lens is illustrated by the flow diagram in FIG. 1. As illustrated in this example, the method may include accessing data representing an image (as in 100). For example, data representing an existing image may be retrieved from a memory in which it is stored and may be loaded by an image editing application that includes the capability to simulate the effect of various liquids on a camera lens. In another example, data representing an image that is currently being captured by a camera may be input to such an image editing application. As illustrated in this example, the method may include receiving input indicating the addition of a fluid on a virtual camera lens (as in 110). For example, an image editing application that includes the capability to simulate the effect of various liquids on a camera lens may include a user interface module through which a user may indicate that a particular fluid should be deposited on a virtual lens while editing the image represented by the data accessed at step 100. The user interface may allow the selection of various fluid parameters, as described in more detail herein. One such user interface is illustrated in FIG. 7 and described in detail below. The method may also include performing a physically based fluid simulation to model the distribution of the fluid on the virtual lens (as in 120). For example, an image editing application that includes the capability to simulate the effect of various liquids on a camera lens may perform a physically based fluid simulation to model the distribution of the fluid on the virtual lens. One embodiment of a method for performing such a simulation is illustrated in FIG. 2 and described in detail below.

Figure 4:
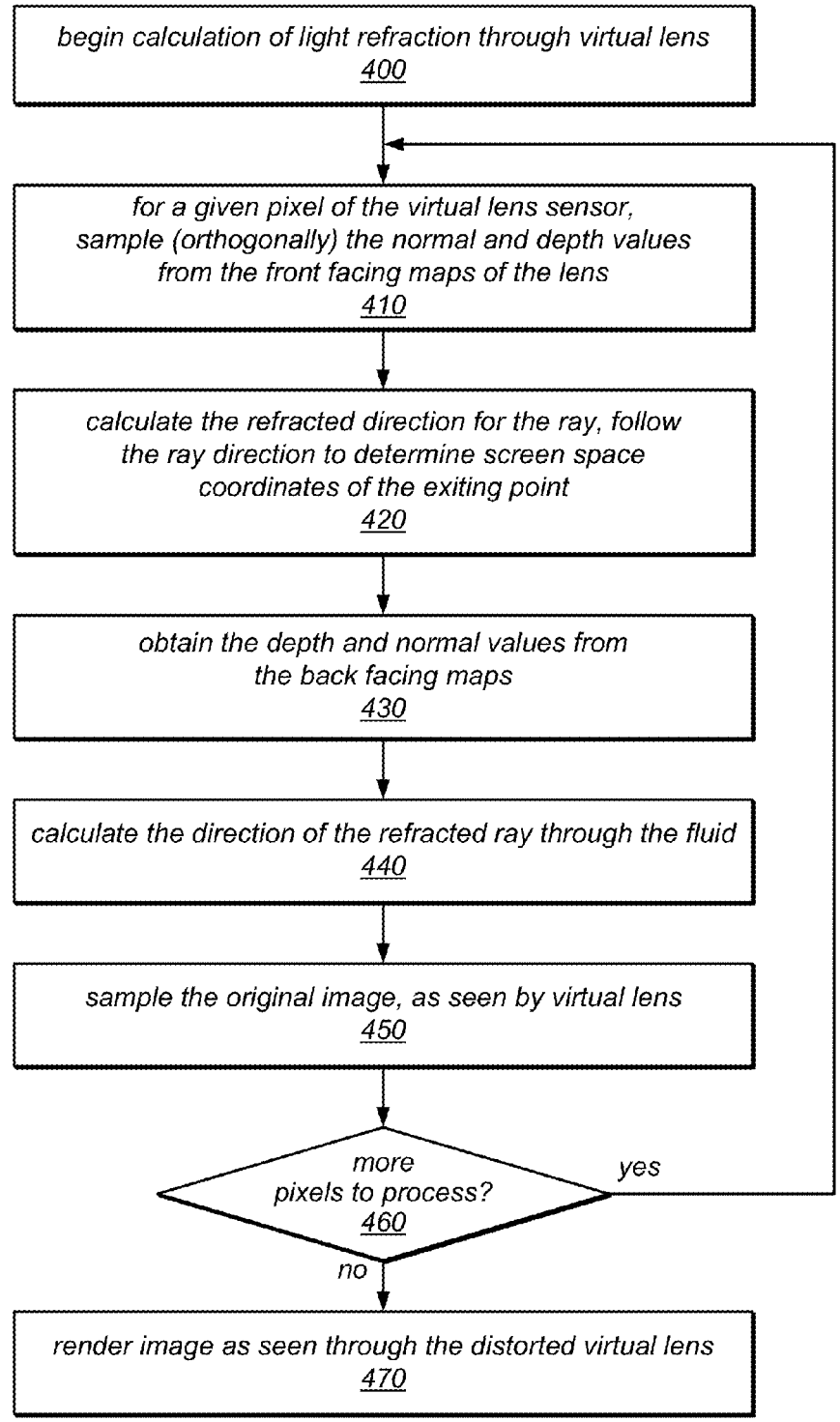
FIG. 4 is a flow diagram illustrating one embodiment of a method for calculating how light is refracted through a virtual lens on which fluid is distributed.

As illustrated in FIG. 1, the method may include determining the perturbation of light from the image (i.e. the image represented by the data that was accessed in step 100) to the virtual sensor (i.e. the virtual sensor corresponding to the virtual camera lens) dependent on the modeled fluid distribution (as in 130). One embodiment of a method for calculating how light is refracted through a virtual lens on which fluid is distributed is illustrated in FIG. 4 and described in detail below. The method may also include displaying the image as it would have been captured by the virtual lens sensor dependent on the determined perturbation of light (as in 140). As illustrated in this example, in response to receiving input representing a manipulation of the fluid on the virtual lens (as in 150), the method may include re-calculating the fluid distribution and/or light perturbation dependent on the manipulation of the fluid (as in 160). For example, an image editing application that includes the capability to simulate the effect of various liquids on a camera lens may include a user interface mechanism through which the application can receive input from a user who manipulates a input device (e.g., a touch-based input device or another type of cursor control type mechanism) to represent smearing, smudging, smoothing, or otherwise re-distributing the fluid on the virtual lens to create an effect on the image being edited. In response, the image editing application may re-calculating the fluid distribution and/or light perturbation, and may display the image as it would have been modified by the manipulation of the fluid on the virtual lens (as in 170).

Note that, in some embodiments, the modified image may be displayed in place (e.g., replacing the affected portion of the input image with a modified version of that portion of the input image in the display). In other embodiments, the modified image may be displayed in a different window of the display than the window in which the input image is displayed. In some embodiments, data representing the modified image may be stored for subsequent display and/or editing (not shown).

In various embodiments, systems and methods described herein may be used to modify a virtual camera lens (e.g., by performing a physical simulation of the presence of a fluid on the lens to create a modified lens), and to simulate the effects of that modified lens on one or more existing images (images loaded by the system for modification) or on input images being captured by a camera (e.g., a direct camera feed). In some embodiments, the virtual lens may be further modified by interactively manipulating a fluid on the virtual lens, and the effect on the input image(s) may be displayed in real time as the fluid is being manipulated. In various embodiments, a user may manipulate the fluid by invoking a fluid application tool of an image editing application that is driven through touch input of a tablet device or by other input mechanisms of a tablet device or other type of computing device. In some embodiments, the user may select the type of fluid to be simulated from among multiple fluid types for which fluid property values have been defined in the image editing application (or a fluid simulation module thereof). For example, a user may select from water, oil, honey, a cream, petroleum jelly, or other fluids commonly used to produce image effects in analog photography. In some embodiments, any pre-set property values of supported fluid types may be overridden by a user, and/or users may define their own fluid types by specifying various properties of a custom fluid type. In some embodiments, simulating the effects of a modified lens on an image may include ray tracing from the virtual sensor through the modified lens to the image to render to a final image based on the refraction of light through the lens and the fluid. In other words, in various embodiments, a trade-off may be made between simulation/calculation speed (and a desire for real-time feedback) and accuracy of the results.

In various embodiments, the systems described herein may implement these simulation techniques in one or more software modules and may execute them fast enough to achieve real time feedback, while producing physically plausible results. For example, in some embodiments, an image editing application may include a fluid simulation module and a ray tracing module that together may be used to simulate the effects of adding and/or manipulating various fluids on a virtual camera lens in real time.

In some embodiments, the fluids simulation may use a height map when modeling the fluid. For example, it may model the fluid using a 2D fluid grid with vertical flow to simulate its expansion. The physics may be computed via an incompressible and viscid Navier-Stokes solver. In some embodiments, a 3D grid (32×32×2) with collocated velocity and pressure may be employed. The grid used for rendering may in some embodiments be on the order of four times the size of the one used for simulation. In some embodiments, when the user performs injection of additional liquid, this alters the height of the fluid at that location, which may add divergence and may produce expansion in the velocity pressure projection. In some embodiments in which there are performance restrictions, the simulation grid resolution may be kept relatively low, e.g., as low as 32×32. However, the phenomena being approximated are low frequency. Therefore, this level of resolution may be sufficient for the purposes of simulating liquid-on-lens effects. In some embodiments, the complete fluids simulation may be performed on CPU, and may use a simple fragment shader (e.g., a fragment shader that is compatible with the OpenGL® graphics API) for visualizing the results.

One embodiment of a method for simulating the distribution of a fluid on a virtual camera lens is illustrated by the flow diagram in FIG. 2. As illustrated in this example, the method may include creating a model for fluid on a virtual lens using a 2D fluid grid plus a height field for vertical flow/expansion (as in 200). The method may also include adding a fluid that has various pre-set and/or user-specified properties to the virtual lens (as in 210). For example, in various embodiments, users may be able to select a pre-defined combination of parameter values that represent a real-world or imagined fluid, and/or may be able to select any arbitrary or custom combination of default and/or configurable parameter values for a fluid to be used in the simulation.

As illustrated in this example, the method may include altering the height of the fluid at locations of changes in the fluid, e.g., due to the injection or manipulation of the fluid (as in 220). For example, as fluid is added and/or redistributed across the virtual lens (using one or more user input mechanisms, such as those described herein), the height field for the fluid model may be modified to reflect the amount (and thus the height) of the fluid at given points on the virtual lends. The method may also include performing a physically based fluid simulation to model the expansion and/or movement of the fluid and to determine the distribution of the fluid over the lens following the injection/manipulation of fluid (as in 230). As illustrated in FIG. 2, as more fluid is injected and/or manipulated by a user (shown as the positive exit from 240), the operations illustrated as 220 and 230 may be repeated for each successive injection and/or manipulation (shown as the feedback from 240 to 220) until there are no further changes in the fluid distribution (shown in FIG. 2 as the negative exit from 240 and element 250).

In some embodiments, to render the resulting distortions, the image editing application may be configured to ray trace the optical system (e.g., the lens and deposited fluid) in order to simulate the light traveling from the source image to the virtual sensor (i.e. the final image). As traditional ray tracing may not be possible to run in real time on some computing platforms, a more efficient image space approach may be applied, in some embodiments. This approach may represent the object as a combination of normal and depth maps. For example, this representation may use one depth map and one bent normal map for the front facing half of the object, and another pair for the back facing half. These maps may be pre-calculated from the sensor point of view (for the front facing maps) and from the opposite location with respect to the center of the object (for the back facing maps). The back facing maps may need to be transformed properly to be coherent with the front facing ones from the sensor point of view. In this way, a 2D representation of the original 3D object, as seen by the sensor, may be obtained. In some embodiments, this representation may contain enough geometric information to calculate a physically plausible refraction of the light through the lens. Additionally, some embodiments may add a fluid layer on top of the back facing part of the lens. For example, this may be done by interpreting the fluid height map as the thickness of the fluid along the normal direction of the lens surface. Furthermore, the fluid normal map may be obtained directly from its height map, in some embodiments.

Figure 3:
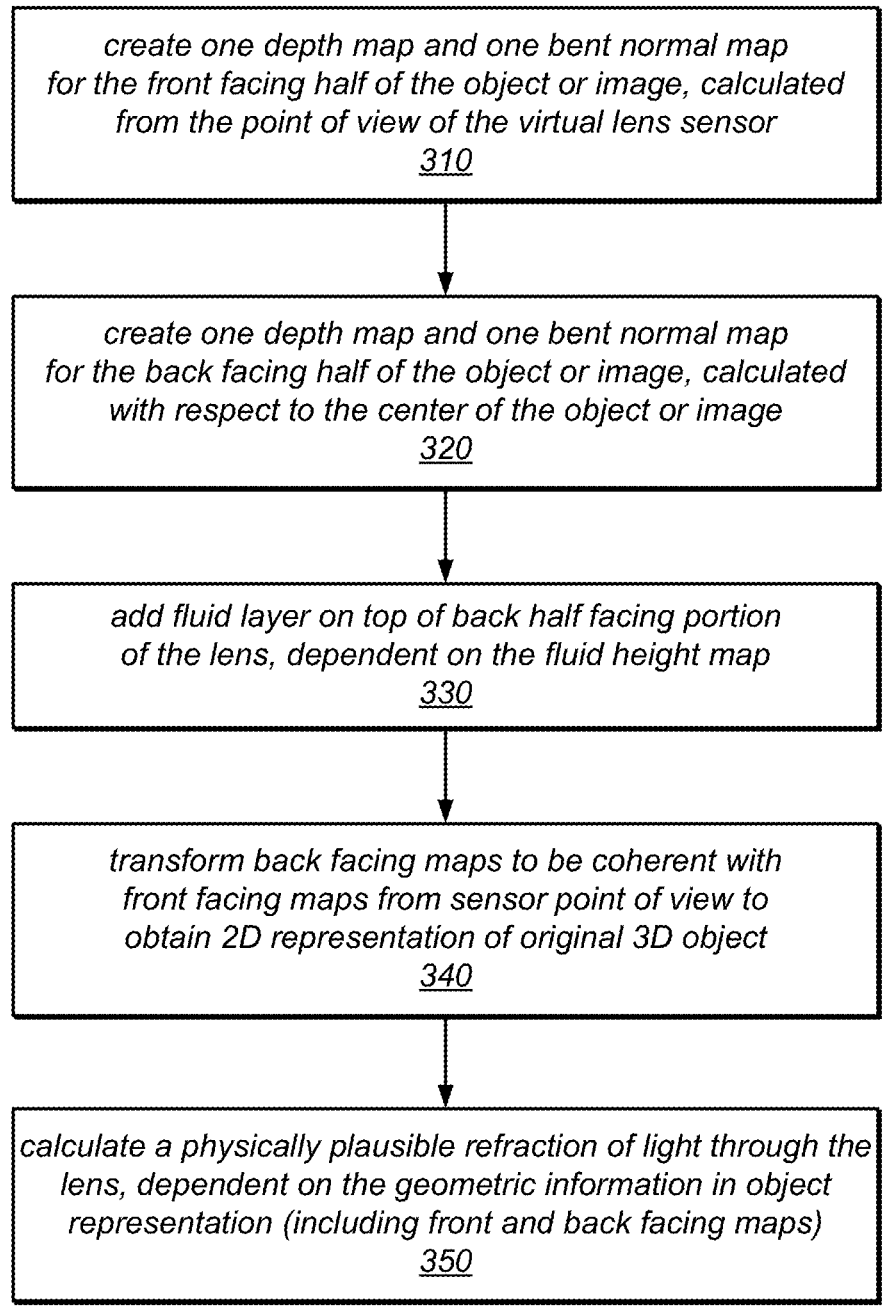
FIG. 3 is a flow diagram illustrating one embodiment of a method for creating depth and bent normal maps for the front facing half of an object and the back facing half of an object.

One embodiment of a method for creating depth and bent normal maps for the front facing half of a 3D object in a source image and the back facing half of the object to calculate the refraction of light through the virtual lens and liquid is illustrated by the flow diagram in FIG. 3. As illustrated in this example, the method may include creating one depth map and one bent normal map for the front facing half of the object or image, which may be calculated from the point of view of the virtual lens sensor (as in 310). The method may also include creating one depth map and one bent normal map for the back facing half of the object or image, which may be calculated with respect to the center of the object or image (as in 320).

As illustrated in this example, the method may include adding a fluid layer on top of the back half facing portion of the lens, which may be dependent on the fluid height map (as in 330). The method may also include transforming the back facing maps to be coherent with the front facing maps from the sensor point of view to obtain a 2D representation of the original 3D object in the source image (as in 340). As illustrated in FIG. 3, the method may include calculating a physically plausible refraction of light through the lens, which may be dependent on the geometric information in the 2D object representation, including the front and back facing maps (as in 350).

In some embodiments, once the depth and bent normal maps have been created, this information may be used to calculate light refraction. For example, for each pixel of the sensor, the corresponding normal and depth values may be sampled orthogonally (assuming the sensor is far enough from the lens) from the front facing maps of the lens. The refracted direction may then be calculated for the ray. Next, this direction may be followed for finding the screen space coordinates of the exiting point, and the depth and normal values may be obtained from the back facing maps. This process may be repeated for the refracted ray passing through the fluid. Once the corresponding geometric information has been obtained on the fluid surface, the original image may be sampled, interpreted as the virtual scene seen by the virtual camera lens (as seen through any deposited fluid). Additional rays per sensor pixel may be traced, in some embodiments, with subtle perturbations with respect to the orthogonal direction. This may in some cases produce better blurred distortions at the expense of more execution time.

One embodiment of a method for calculating how light is refracted through a virtual lens on which fluid is distributed is illustrated by the flow diagram in FIG. 4. As illustrated in this example, the method may include beginning a calculation of light refraction through a virtual lens (as in 400). In this example, for a given pixel of the virtual lens sensor, the method may include sampling (orthogonally) the normal and depth values from the front facing maps of the lens (as in 410). The method may also include (for the given pixel) calculating the refracted direction for the ray, and following the ray direction to determine screen space coordinates of the exiting point (as in 420).

As illustrated in FIG. 4, the method may include (for the given pixel) obtaining the depth and normal values from the back facing maps (as in 430). The method may also include (for the given pixel) calculating the direction of the refracted ray through the fluid (as in 440), and sampling the original image, as seen by virtual lens (as in 450). As illustrated in this example, the operations illustrated as elements 410-450 may be repeated in order to process additional pixels of the image (e.g., those pixels that are visible through the virtual lens). In this example, as long as there are additional pixels to be processed (shown as the positive exit from 460), these operations may be repeated for each additional pixel (illustrated in FIG. 4 as the feedback from 460 to 410). Once there are no additional pixels to be processed (shown as the negative exit from 460), the method may include rendering the image as seen through the distorted virtual lens (as in 470).

In various embodiments, different algorithms may be employed in calculating the exiting point in image space. One approach may use pre-calculated distances from each point of the front facing maps to the corresponding point on the back facing map along the normal direction of the front facing half of the lens. However, since the fluid maps described herein may be dynamic, pre-calculating these values may not be optimal. Another approach may solve the handling of deformable objects by performing a dynamic binary search using only depth information. Since such an approach may take into account perspective parameters of the camera, it may perform extra calculations not needed when orthogonally is assumed (as described above). Another approach may use a binary search combined with direct trigonometric calculus, when possible. Note that in some embodiments the refraction calculus may be performed efficiently on a GPU, e.g., using a fragment shader.

In some embodiments, the screen space ray tracing approaches described herein may consider the environment being sampled is a cube map or a 3D scene. In cases in which the environment map is a single 2D image, some rays may end pointing outside of the image, regardless of the scaling factor of the 2D image. In some embodiments, this issue may be solved by repeating the image in a tiling way, which may make the sample points of the rays always end inside the input image, and may produce high quality, plausible results.

Figure 5:
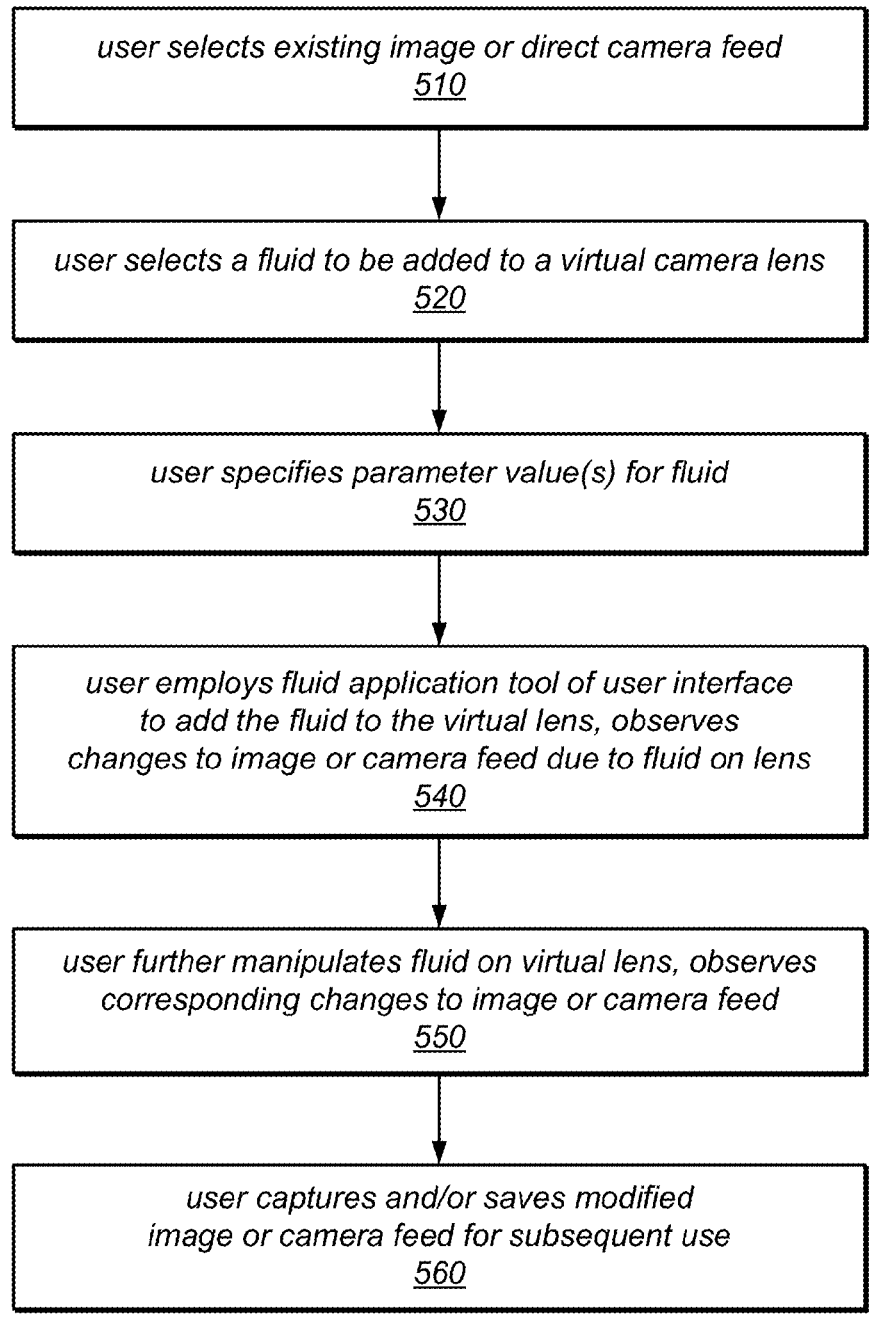
FIG. 5 is a flow diagram illustrating one embodiment of a method for applying the simulation and image rendering techniques described herein.

One embodiment of a method for applying the simulation and image rendering techniques described herein is illustrated by the flow diagram in FIG. 5. As illustrated in this example, the method may include a user selecting, as a source of one or more input images to the simulation and image rendering techniques, an existing image or a direct camera feed (as in 510). For example, the user may select an existing image that is stored in memory accessible to an image editing application through a user interface module of the application, and in response, data representing the image may be loaded by the application for subsequent editing. In another example, the user may select a camera feed as the source of one or more images to which the techniques described herein may be applied through a user interface of such an application. In this example, in addition to selecting the source of one or more input images, the user may also select a fluid to be added to a virtual camera lens (as in 520), and/or the user may specify one or more parameter values for the fluid to be added to the virtual camera lens (as in 530). One embodiment of a user interface through which input images, fluids, and/or fluid parameters may be selected is illustrated in FIG. 7 and described in more detail below.

As illustrated in this example, the method may include the user employing a fluid application tool of a user interface to add the fluid to the virtual lens, and observing changes to the image or camera feed due to the fluid on the virtual lens (as in 540). For example, the user may indicate a manipulation of the fluid using a touch-based input mechanism (e.g., a touch pad, a tablet device that detects the touch of a stylus or finger, or a brush tool of the image editing device) or another type of cursor control mechanism (e.g., a joystick, track ball, a mouse, etc.) As the user continues to manipulate the fluid on the virtual lens, the user may observe the corresponding changes to the image or camera feed (as in 550). In other words, as the user provides input representing smearing, smudging, smoothing, or otherwise re-distributing the fluid on the virtual lens, the image editing application may display the effects of that manipulation on the portion of the image or camera feed being displayed that is visible through the virtual lens. As illustrated in this example, when the user is satisfied with the results (or at any intermediate point in the editing session), the user may capture and/or save data representing the modified image or camera feed for subsequent use (as in 560).

Figure 6:
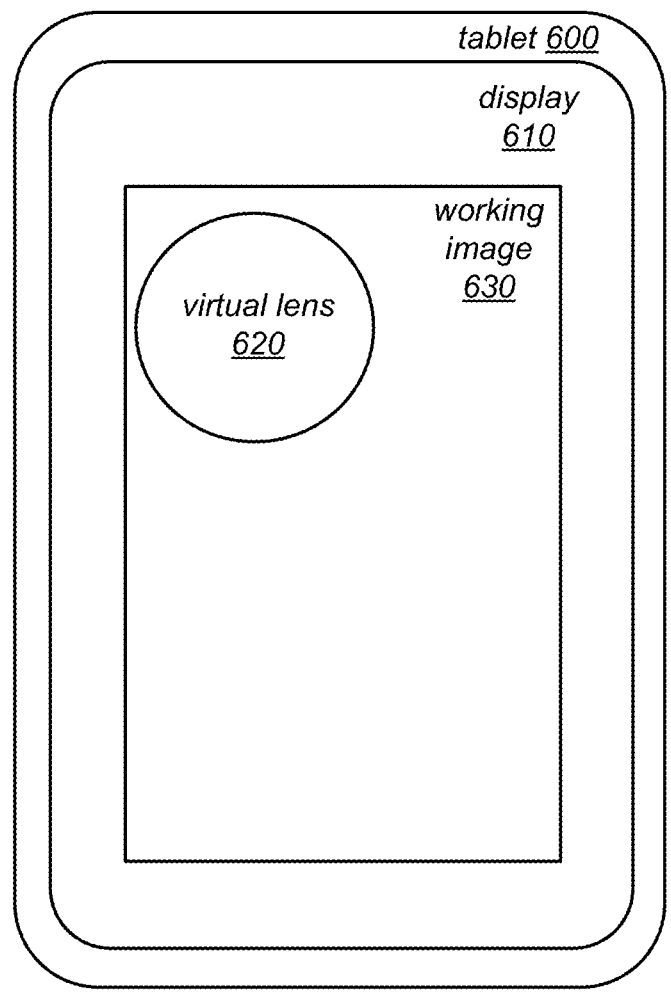
FIG. 6 is a block diagram illustrating a tablet device on which the methods described herein may be employed, according to one embodiment.

FIG. 6 is a block diagram illustrating a tablet device 600 on which the methods described herein may be employed, according to one embodiment. In this example, tablet 600 includes a display portion 610 in which a working image 630 and a virtual lens 620 are displayed. In some embodiments, display 610 may present a view of an image (or camera feed) to which a liquid-on-lens effect is being applied in response to selection of an input image (or source) and/or the selection of a virtual lens tool or a fluid applicator tool for editing using an image editing application that is executing on tablet device 600 and that is configured to facilitate the creation of such effects. As illustrated in this example, the presented view may include an indication of the position of the virtual lens 620 over the input image(s) to which such effects are being applied (i.e. over a portion of working image 630) as such effects are being applied, and the portion of working image 630 displayed within the boundaries of virtual lens 620 may reflect a view of that portion of working image 630 seen through the virtual lens, as distorted by the fluid. In some embodiments, display 610 may also include a user interface portion (not shown), such as the user interface illustrated in FIG. 7 and described in detail below.

FIG. 7 is a block diagram illustrating one embodiment of a display 700 for an image editing application that performs simulations of the effects of fluids on a camera lens, as described herein, and a user interface of an image editing application usable to create the liquid-on-lens effects described herein. The user interface may in some embodiments be provided as a module of the image editing application. In other embodiments, it may be provided as a module of another application through which functions of the image editing application can be accessed. As illustrated in this example, the image editing application (or a module thereof) may provide a user interface including one or more user interface elements through which a user may select and control the application and/or manipulation of fluids on a virtual lens to simulate various analog photography effects, as described herein. The user interface for the image editing application may provide other user interface elements for controlling various aspects of these and other image editing operations and/or for performing other graphics-related tasks. The user interface illustrated in FIG. 7 is provided as an example of one possible implementation, and is not intended to be limiting.

FIG. 7 illustrates an example display 700 on which a user interface to an image editing module may be implemented, according to one embodiment. In this example, the display is divided into five regions or areas: menus 706, tools 702, color controls 704, fluid controls 710, and work area 708. Tools 702 may include one or more user-selectable user interface elements. In this example, it is this area that contains the user interface elements that a user may select to apply liquid-on-lens effects to an image. For example, the user may select a virtual lens tool and/or a fluid applicator tool for use in applying a fluid to a virtual lens 720 through which an image that is being created and/or edited in work area 708 can be viewed. Other optional tools may be selected as well, such as an undo or reset function. While FIG. 7 shows the elements in tools 702 as radio buttons, other types of user interface elements, such as pop-up or pull-down menus, may be used to select from among one or more image editing tools in various embodiments. As noted above, the reset and undo tools illustrated in FIG. 7 are optional, and thus may or may not be included on the user interface in various embodiments. Various embodiments may include other tools not shown as well, such as a redo tool that re-applies the most recent undone user action in the work area 708.

In this example, color controls 704 may include one or more user-modifiable controls, such as slider bars, dials, pop-up or pull-down menus, alphanumeric text entry boxes, etc., for specifying the hue and/or intensity of a fluid to be applied to an image (e.g., using the fluid applicator, or using a brush tool, not shown). In this example, three slider bars are provided that may be used to specify the color of a fluid to be applied (e.g., using the fluid applicator tool or a brush tool), the color of ink to be deposited (e.g., using a brush tool or another image editing tool, not shown), or a color to be used in the application of other image editing effects (not shown). These three slider bars correspond to Red, Green, and Blue color channels, respectively.

Similarly, fluid controls 710 may include one or more user-modifiable controls for specifying values (or relative values) of other configurable parameters related to the fluid application tool and/or the simulation of liquids on a camera lens. In this example, two slider bars are provided that may be used to specify an amount of fluid and a pigment concentration amount, respectively, that are to be applied when using the fluid application tool to apply a fluid to virtual lens 720. As illustrated in the example in FIG. 7, fluid controls 710 may also include one or more user-modifiable controls for specifying values (or relative values) of other fluid parameters. In this example, three additional slider bars are provided for specifying a transparency parameter value, a viscosity parameter value, and an index of refraction for the fluid, respectively. In this example, a box labeled "fluid selection" may be used to select from among multiple pre-defined fluid parameter combinations that may be available to the user (e.g. representing various fluid types). For example, for a fluid selection called "honey", there may be a pre-set value for a viscosity parameter of the fluid (e.g. a relatively high viscosity value), pre-set values for the color of the fluid (mimicking the color of honey), a pre-set value for the transparency of the fluid (e.g. a relatively high transparency value), and/or a pre-set value for the index of refraction of the fluid (mimicking the index of refraction of honey). The pre-set parameter values for fluid selections called "water" or "oil" may be quite different from those of "honey". For example, "water" may have a much lower viscosity value, while "oil" may have a much lower transparency value. Different methods of selecting a fluid type, or of specifying values of any of the other parameters used in simulating liquid-on-lens effects (i.e. methods other than those illustrated in FIG. 7) may be used in other embodiments. For example, parameter values may be input and/or fluid selections may be made using pull-down or pop-up menus, radio buttons, dials, alphanumeric text entry boxes, or other input mechanisms, in various embodiments. In some embodiments, the user interface illustrated in FIG. 7 may include a user interface element usable to select a scaling factor for the distortions created using the fluid applicator (not shown).

In the example illustrated in FIG. 7, menus 706 may include one or more menus, for example menus used to navigate to other displays in the graphics application, open files (e.g., files containing image data), print or save files or images, undo/redo actions, and so on. In some embodiments, menus 706 may include a menu for selecting a source of one or more images to which a liquid-on-lens effect is to be added (e.g., a direct camera feed or other source of images). In other embodiments, an image source may be selected using a user interface element in another portion of the user interface (e.g., tools area 702). In this example, work area 708 is the area in which an image being captured (e.g., from a direct camera feed), created, and/or edited is displayed as image editing operations are performed on the image. In various embodiments, work area 708 may display a portion or all of an image on which a liquid-on-lens effect is being added or modified, or a portion or all of a previously existing image being modified by adding or modifying a liquid-on-lens effect, as described herein. Work area 708 of FIG. 7 illustrates an image modification in progress that includes liquid-on-lens effects such as those described herein.

Figure 8:
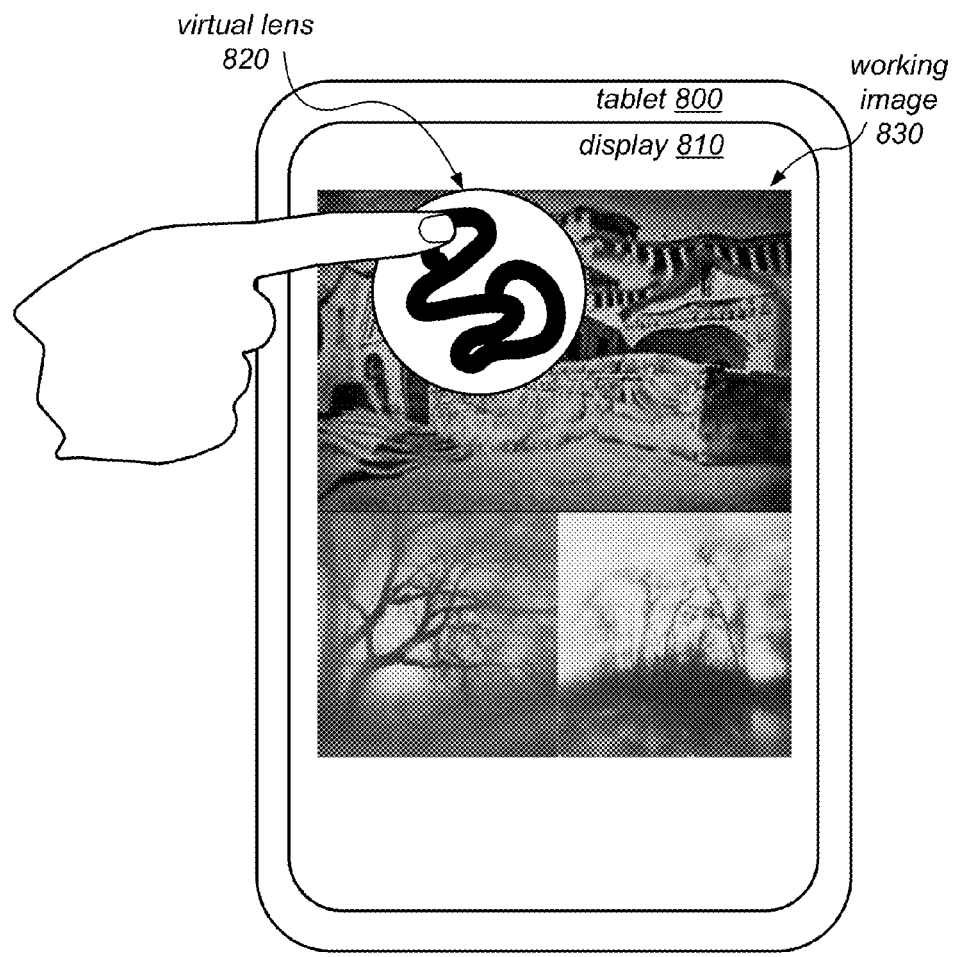
FIG. 8 illustrates the use of an image editing program that performs the simulation of fluids on a camera lens, according to one embodiment.

FIG. 8 illustrates the use of an image editing application that is implemented on a tablet device 800 and that simulates the effects of fluids on a camera lens, according to one embodiment. In this example, a working image 830 is displayed in display area 810 of the table device 800, and a virtual lens 820 is superimposed over the working image 830. Although not shown in FIG. 8, in some embodiments, the portion of working image 830 that is beneath virtual lens 820 may be displayed within the boundaries of virtual lens 820 in display 810, and may appear as if it were being viewed through virtual lens 820 and any distortions thereof due to fluid on the lens. In this example, a user is manipulating a liquid that has been deposited on virtual lens 820. More specifically, the user is using a finger moving across the touch screen of the tablet device 800 to "smear" the liquid on the virtual lens 820. In some embodiments, the user may observe the effects of this manipulation on the portion of working image 830 that is beneath the virtual lens 820 in real time. In other words, the display of working image 830 may be continuously or periodically updated as the fluid is being manipulated by the user such that the portion of working image 830 under the virtual lens 820 (or within the boundaries of virtual lens 820 in display 810) at any given time reflects the distortion of the view of that portion of the image through the virtual lens 820 and the fluid on the lens.

Figure 9:
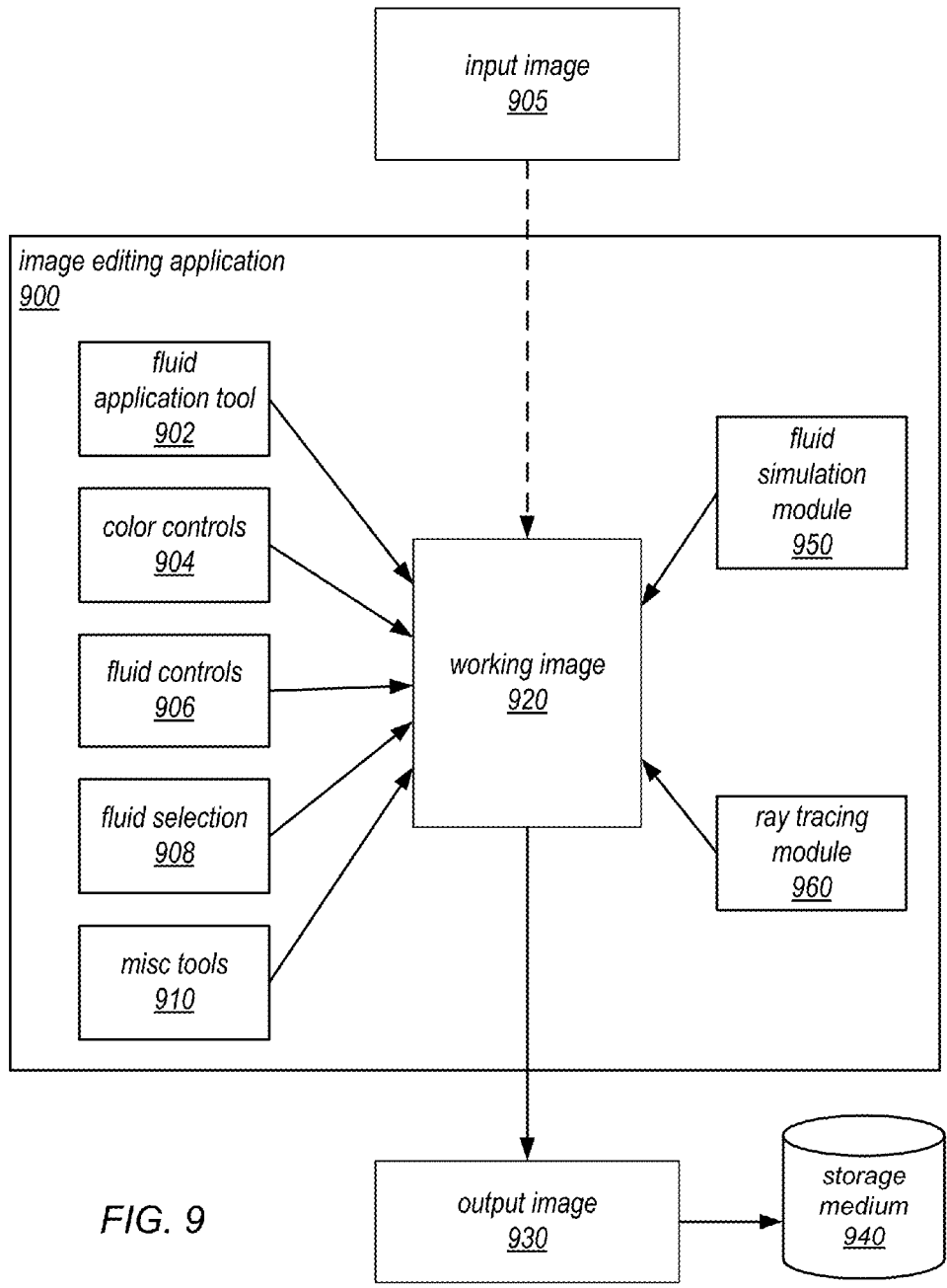
FIG. 9 is a block diagram illustrating one embodiment of an image editing program that performs the simulation of fluids on a camera lens.

FIG. 9 is a block diagram illustrating one embodiment of an image editing application 900 that is configured to simulate the effects of fluids on a camera lens. As illustrated in FIG. 9, image editing application 900 may receive an input image 905 to be used as the working image 920. Alternatively, image editing application 900 may be used to generate a new image as working image 920, or may capture an image from a direct camera feed for use as working image 920. In some embodiments, the user may select a source for working image 920 using a "source" or "file" operation (e.g., through menus 706 of FIG. 7). In this example, fluid application tool 902 may be used to interactively generate a liquid-on-lens effect on working image 920 under user control, as described herein. As described above, image editing application 900 may include mechanisms for controlling the color of the fluid deposited on a virtual lens to modify working image 920 (e.g., color controls 904), for controlling the amount of the fluid, the concentration of the pigment, the viscosity, the transparency, and/or the index of refraction of the fluid (e.g., fluid controls 906), and/or for selecting various pre-set fluid properties (e.g., fluid selection 908). Other tools 910 may be included in image editing application for performing modifications to working image 920 other than liquid-on-lens effects. In some embodiments, any or all of fluid application tool(s) 902, color controls 904, fluid controls 906, fluid selection 908, and/or miscellaneous tools 910 may be included in a user interface module of the image editing application 900 (not shown) or in a user interface module of another application through which functions of the image editing application 900 are accessible.

As described herein, image editing application 900 may include a fluid simulation module 950 and a ray tracing module 960, which together may implement the fluid simulations and ray tracing operations described herein to modify working image 920 so that it reflects the liquid-on-lens effects indicated by user input (e.g., through a user interface such as that illustrated in FIG. 7). In this example, once the user has completed one or more graphics editing operations, the graphics editing module may display an updated working image 920 reflecting those operations. In some embodiments, the user may select a "save" "file" or "print" operation (e.g., from menus 706 of FIG. 7) to produce and/or store an output image 930 reflecting the liquid-on-lens effects produced by image editing application 900. Output image 930 may, for example, be stored to a local or network storage medium 940, such as system memory, a local or network disk drive or other storage system, DVD, CD, etc., and subsequently accessed by image editing application 900 for use in subsequent operations. In some embodiments, output image 930 may be displayed to users in real time, e.g., via the display of a tablet device or another device on which image editing application 900 is executing (not shown).

Example Implementations

Some embodiments may include a means for simulating fluid distribution on a virtual lens. For example, a fluid simulation module may receive input indicating that a particular fluid should be added to and/or manipulated on a virtual lens, and may perform a physically based simulation to determine the distribution of the fluid over the virtual lens resulting from the injection and/or manipulation of the fluid, as described herein. The fluid simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input indicating that a particular fluid should be added to and/or manipulated on a virtual lens, and performing a physically based simulation to determine the distribution of the fluid over the virtual lens resulting from the injection and/or manipulation of the fluid, as described herein. Other embodiments of the fluid simulation module may be at least partially implemented by hardware circuitry and/or firmware stored, for example, in a non-volatile memory.

Some embodiments may include a means for rendering an image that has been distorted by the addition and/or manipulation of fluids on a virtual camera lens. For example, a ray tracing module may simulate light traveling from a source image to a sensor of the virtual camera through the optical system (e.g., the virtual lens and fluid), and may render a final image that includes any distortions resulting from the injection and/or manipulation of the fluid, as described herein. The ray tracing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform simulating light traveling from a source image to a sensor of the virtual camera through the optical system (e.g., the virtual lens and fluid), and rendering a final image that includes any distortions resulting from the injection and/or manipulation of the fluid, as described herein. Other embodiments of the ray tracing module may be at least partially implemented by hardware circuitry and/or firmware stored, for example, in a non-volatile memory.

Some embodiments may include a means for receiving input indicating the addition and/or manipulation of fluids on a virtual camera lens. For example, a user interface module may receive input representing the selection of a fluid and/or the values of various fluid parameters, and/or may receive input representing the manipulation of the fluid on a virtual camera lens (e.g., smearing, smudging, smoothing, or otherwise re-distributing the fluid), as described herein. The user interface module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input representing the selection of a fluid and/or the values of various fluid parameters, and/or receiving input representing the manipulation of the fluid on a virtual camera lens (e.g., smearing, smudging, smoothing, or otherwise re-distributing the fluid), as described herein. Other embodiments of the user interface module may be at least partially implemented by hardware circuitry and/or firmware stored, for example, in a non-volatile memory.

Example System

Figure 10:
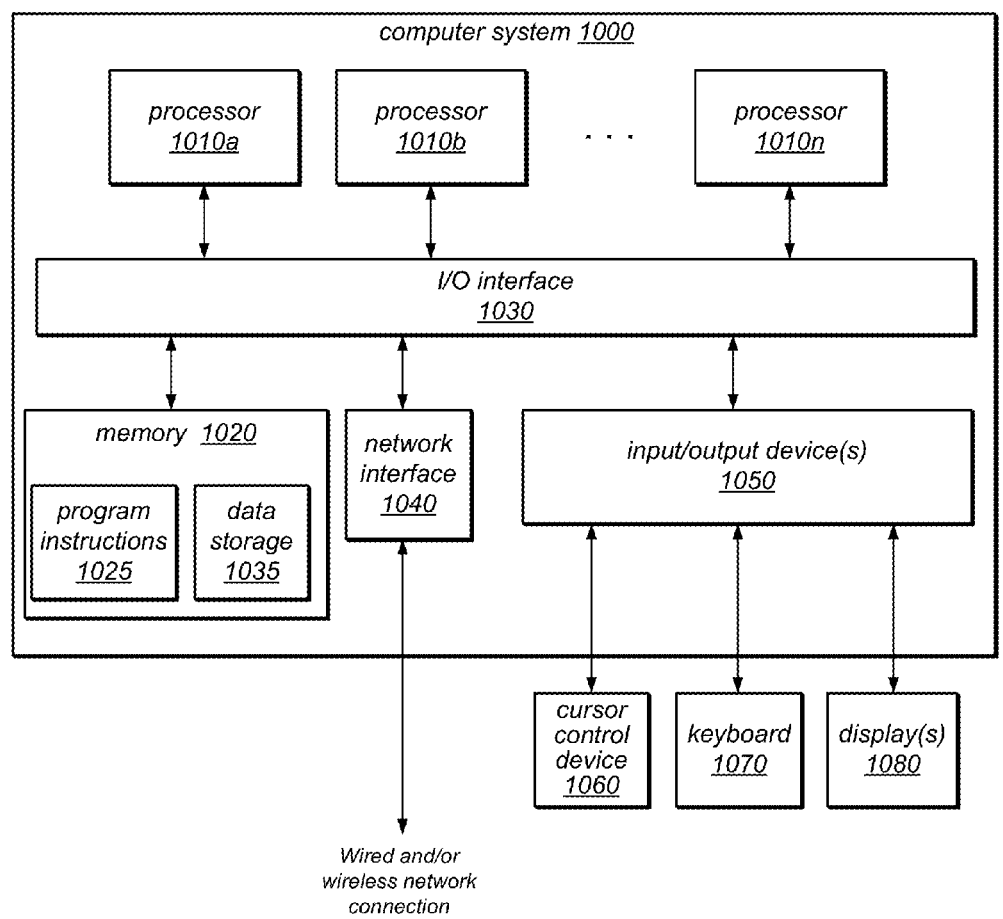
FIG. 10 illustrates an example computer system that is configured to simulate the effects of fluids on a camera lens, according to some embodiments.

Embodiments of an image editing application and/or of the various modules thereof, as described herein, may be executed on one or more computer systems, which may interact with various other devices. FIG. 10 illustrates an example computer system 1000 that is configured to simulate the effects of fluids on a camera lens, according to some embodiments. In different embodiments, computer system 1000 may be any of various types of devices, including, but not limited to, a personal computer system, desktop computer, laptop, notebook, tablet device, slate device, netbook computer, mainframe computer system, handheld computer, workstation, network computer, camera, set top box, mobile device, consumer device, video game console, handheld video game device, application server, storage device, peripheral device (such as a switch, modem, or router), or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In various embodiments, cursor control device 1060 may include one or more simple or advanced stylus devices, mouse devices, touchpads, and/or any other suitable cursor control devices. In various embodiments, display devices 1080 may include one or more simple or advanced tablet or slate devices (including, but not limited to, those described herein) and/or other types of devices that include a display capability and that may serve as input and/or output devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, tablet device, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the data processing methods disclosed herein for modeling fluids on a camera lens and/or simulating the effects of those fluids on images viewed through the virtual lens may be implemented, at least in part, by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an image editing application that is configured to simulate the effects of fluids on a camera lens (and/or modules thereof, e.g., a user interface module, fluid simulation module, and/or ray tracing module) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include non-transitory, computer-readable storage media or memory media such as magnetic or optical media (e.g., disk or CD/DVD-ROM), volatile or non-volatile media such as RAM (e.g. SDRAM, DDR, RDRAM, SRAM, etc.), ROM, etc., coupled to computer system 1000 via I/O interface 1030. In some embodiments, program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, cursor control devices, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of an image editing application that is configured to simulate the effects of fluids on a camera lens as described herein, and data storage 1035, comprising various data accessible by program instructions 1025. In one embodiment, program instructions 1025 may include software elements of embodiments of an image editing application as illustrated in the above figures. Data storage 1035 may include data that may be used by an image editing application that is configured to simulate the effects of fluids on a camera lens, in various embodiments (e.g., image data for input images, working images, and/or output images; default and/or pre-set fluid parameter values; selected (custom) fluid parameter values for a given image editing exercise; data representing one or more fluid models; simulation parameter values; or any other data or information usable for implementing the image editing techniques described herein). In other embodiments, other or different software elements and data may be included in memory 1020.

Those skilled in the art will appreciate that computer system 1000 is merely illustrative and is not intended to limit the scope of an image editing application that is configured to simulate the effects of fluids on a camera lens, as described herein. In particular, computer system 1000 and/or other devices that may be configured to simulate the effects of fluids on a camera lens may include any combination of hardware or software that can perform the indicated functions, including, but not limited to, a computer, personal computer system, desktop computer, laptop, notebook, tablet device, slate device, netbook computer, mainframe computer system, handheld computer, workstation, network computer, camera, set top box, mobile device, network device, internet appliance, PDA, wireless phone, pager, consumer device, video game console, handheld video game device, application server, storage device, peripheral device (such as a switch, modem, or router), or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components described herein may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. As previously noted, various embodiments may further include receiving, sending or storing instructions and/or data implemented in accordance with the foregoing description upon a computer-accessible medium. Accordingly, the techniques described herein may be practiced with other computer system configurations.

The various methods as illustrated in the figures and described herein represent example embodiments of methods for modeling fluids on a camera lens and/or simulating the effects of those fluids on images viewed through the virtual lens. The methods may be implemented in software, hardware, or a combination thereof. In various embodiments, the order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, that the above description is to be regarded in an illustrative rather than a restrictive sense.

What is claimed is:

1. A method, comprising:
    performing, by a computer:
        accessing data representing an input image;
        receiving data representing a deposition of a fluid on a virtual camera lens, the received data indicating a value of an amount of the fluid deposited on the virtual camera lens;
        receiving data representing a manipulation of the deposited fluid on the virtual camera lens;
        creating a modified image that reflects a distortion of the input image that would be visible when viewed through the virtual camera lens, dependent on the deposition and manipulation of the fluid on the virtual camera lens; and
        outputting data representing the modified image.

2. The method of claim 1, wherein said creating comprises modeling the behavior of the fluid on the virtual camera lens using a physically based simulation.

3. The method of claim 2, wherein said modeling is dependent on a value of a parameter that represents a physical property of the fluid.

4. The method of claim 2, wherein said modeling comprising modeling the fluid using a two-dimensional fluid grid and height map.

5. The method of claim 1, wherein said creating comprises:
    performing a ray tracing operation that simulates light traveling from the input image to a virtual camera sensor, as refracted by the virtual camera lens and the fluid on the virtual camera lens; and
    rendering the modified image, dependent on results of the ray tracing operation.

6. The method of claim 1, wherein the data representing the input image is accessed from a memory in which it is stored.

7. The method of claim 1, wherein the data representing the input image is accessed through a direct feed from a camera on which the input image was captured.

8. The method of claim 1, wherein said receiving data representing a manipulation comprises receiving data representing an interactive manipulation of the fluid on the virtual lens.

9. The method of claim 8, wherein said outputting data comprises displaying the modified image in real time as the interactive manipulation is performed.

10. The method of claim 1, wherein said receiving data representing a manipulation comprises receiving data from a touch-based input device.

11. The method of claim 1, wherein said receiving data representing a deposition comprises receiving data indicating selection of the fluid from among two or more fluids for which a value of one or more parameters that represent physical properties of the fluids have been pre-defined.

12. The method of claim 1, wherein said receiving data representing a deposition further comprises receiving data indicating a value of one or more of: a viscosity of the fluid, a color of the fluid, a pigment concentration of the fluid, a transparency of the fluid, or an index of refraction of the fluid.

13. A system, comprising:
    an input device;
    a display device; and
    a computer device comprising at least one processor and a memory comprising program instructions that are executable by the at least one processor to:
        access data representing an input image;
        receive data representing a deposition of a fluid on a virtual camera lens, the received data indicating a value of an amount of the fluid deposited on the virtual camera lens;
        receive, from the input device, data representing a manipulation of the deposited fluid on the virtual camera lens;
        create a modified image that reflects a distortion of the input image that would be visible when viewed through the virtual camera lens, dependent on the deposition and manipulation of the fluid on the virtual camera lens; and
        display the modified image on the display device.

14. The system of claim 13,
wherein said creating comprises modeling the behavior of the fluid on the virtual camera lens using a physically based simulation; and
wherein said modeling is dependent on a value of a parameter that represents a physical property of the fluid.

15. The system of claim 13, wherein said creating comprises:
performing a ray tracing operation that simulates light traveling from the input image to a virtual camera sensor, as refracted by the virtual camera lens and the fluid on the virtual camera lens; and
rendering the modified image, dependent on results of the ray tracing operation.

16. The system of claim 13, wherein said receiving data representing a manipulation comprises receiving data representing an interactive manipulation of the fluid on the virtual lens using a touch-based input device.

17. A non-transitory, computer-readable storage medium storing program instructions that when executed on one or more computers cause the one or more computers to perform:
accessing data representing an input image;
receiving data representing a deposition of a fluid on a virtual camera lens, the received data indicating a value of an amount of the fluid deposited on the virtual camera lens;
receiving data representing a manipulation of the deposited fluid on the virtual camera lens;
creating a modified image that reflects a distortion of the input image that would be visible when viewed through the virtual camera lens, dependent on the deposition and manipulation of the fluid on the virtual camera lens; and
outputting data representing the modified image.

18. The non-transitory, computer-readable storage medium of claim 17,
wherein said creating comprises modeling the behavior of the fluid on the virtual camera lens using a physically based simulation; and
wherein said modeling is dependent on a value of a parameter that represents a physical property of the fluid.

19. The non-transitory, computer-readable storage medium of claim 17, wherein said creating comprises:
performing a ray tracing operation that simulates light traveling from the input image to a virtual camera sensor, as refracted by the virtual camera lens and the fluid on the virtual camera lens; and
rendering the modified image, dependent on results of the ray tracing operation.

20. The non-transitory, computer-readable storage medium of claim 17, wherein said receiving data representing a manipulation comprises receiving data representing an interactive manipulation of the fluid on the virtual lens using a touch-based input.

* * * * *